(12) United States Patent
Reddy et al.

(10) Patent No.: US 9,051,506 B2
(45) Date of Patent: Jun. 9, 2015

(54) HYDRATION ACCELERATION SURFACTANTS IN CONJUNCTION WITH HIGH MOLECULAR WEIGHT POLYMERS, AND METHODS AND COMPOSITIONS RELATING THERETO

(75) Inventors: B. Raghava Reddy, The Woodlands, TX (US); Freddy Crespo, Spring, TX (US); Larry S. Eoff, Duncan, OK (US); Christopher A. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 388 days.

(21) Appl. No.: 13/586,026

(22) Filed: Aug. 15, 2012

(65) Prior Publication Data
US 2014/0048260 A1 Feb. 20, 2014

(51) Int. Cl.
*E21B 43/22* (2006.01)
*E21B 43/12* (2006.01)
*E21B 43/16* (2006.01)
*E21B 33/13* (2006.01)
*C09K 8/512* (2006.01)
*C09K 8/88* (2006.01)

(52) U.S. Cl.
CPC ............... *C09K 8/512* (2013.01); *E21B 43/16* (2013.01); *E21B 33/13* (2013.01); *E21B 43/12* (2013.01); *C09K 8/887* (2013.01)

(58) Field of Classification Search
CPC ........ C09K 8/032; C09K 8/685; C09K 8/887; C09K 2208/00; C09K 8/52; C09K 8/588; E21B 21/003; E21B 43/12; E21B 43/16
See application file for complete search history.

(56) References Cited

U.S. PATENT DOCUMENTS

| | | |
|---|---|---|
| 4,506,062 A | 3/1985 | Flesher et al. |
| 6,176,315 B1 | 1/2001 | Reddy et al. |
| 6,196,317 B1 | 3/2001 | Hardy |
| 7,091,160 B2 | 8/2006 | Dao et al. |
| 7,287,587 B2 | 10/2007 | Reddy et al. |
| 7,322,414 B2 | 1/2008 | Reddy et al. |
| 7,325,613 B2 | 2/2008 | Reddy et al. |
| 7,331,390 B2 | 2/2008 | Eoff et al. |
| 2005/0143506 A1 | 6/2005 | Harrington et al. |

FOREIGN PATENT DOCUMENTS

| | | |
|---|---|---|
| WO | 0036269 A1 | 6/2000 |
| WO | 2011107735 A1 | 9/2011 |
| WO | 2011107743 A1 | 9/2011 |
| WO | 2011107761 A1 | 9/2011 |
| WO | 2014028242 A1 | 2/2014 |

OTHER PUBLICATIONS

International Search Report and Written Opinion for PCT/US2013/053360 dated Sep. 19, 2013.

*Primary Examiner* — Zakiya W Bates
(74) *Attorney, Agent, or Firm* — McDermott Will & Emery LLP; Holly Soehnge

(57) ABSTRACT

A hydration acceleration surfactant may be utilized in conjunction with high molecular weight polymers in forming high viscosity, aqueous based treatment fluids. Forming such fluids may involve mixing an aqueous base fluid, a hydration acceleration surfactant, a crosslinker polymer, and a base polymer, thereby yielding a treatment fluid, wherein the base polymer is provided in the form of a first polymeric emulsion before mixing and/or the crosslinker polymer is provided in the form of a second polymeric emulsion before mixing. Further, such fluids may be useful in subterranean operations to perform for at least one function within the wellbore and/or the subterranean formation including bridge a fracture, provide fluid loss control, seal a rock surface, enable fluid diversion, plug a void, reduce formation permeability, control water production, and any combination thereof.

20 Claims, 1 Drawing Sheet

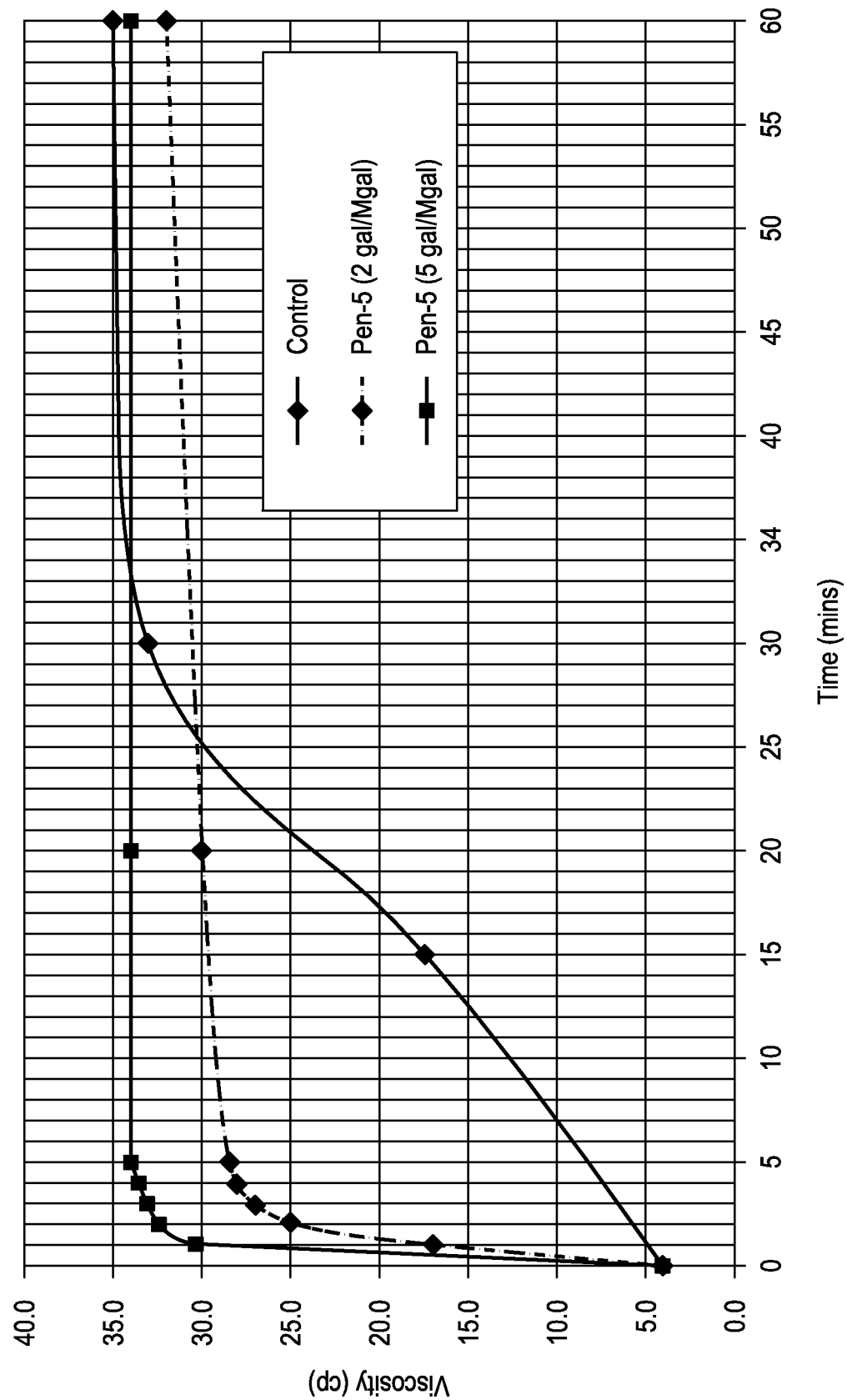

HYDRATION ACCELERATION SURFACTANTS IN CONJUNCTION WITH HIGH MOLECULAR WEIGHT POLYMERS, AND METHODS AND COMPOSITIONS RELATING THERETO

BACKGROUND

The present invention provides for, in some embodiments, hydration acceleration surfactants utilized in conjunction with polymer emulsions, and methods and compositions relating thereto.

High viscosity aqueous-based treatment fluids, e.g., are commonly used in the oil industry in treating subterranean wells, e.g., in fracturing operations, acidizing operations, water control operations, and completion operations. Commonly, such treatment fluids are produced by incorporating into an aqueous-based treatment fluid additives like polymers and, optionally, crosslinking agents (i.e., agents that crosslink the polymer and can further increase the viscosity of the treatment fluid). After addition to the treatment fluid, the polymers and crosslinking agents hydrate, thereby causing the viscosity of the treatment fluid to increase and making reactive sites accessible on each additive.

Lower molecular weight polymers have been used in conjunction with these treatment fluids because they hydrate and form substantially homogeneous mixtures relatively quickly, which consequently makes low molecular weight polymers easy to implement at the well site. However, to create a high viscosity fluid using low molecular weight polymer, a significant loading of polymer is often required, thereby adding significant cost and logistical issues to an operation, especially for remote and offshore well sites. High molecular weight polymers, on the other hand, enable high viscosity fluids at a relatively low polymer loading.

Aqueous-based treatment fluids containing dissolved polymers may be prepared in several ways. Solid polymers may be added to an aqueous base fluid with agitation. Homogeneous solutions can be prepared rapidly when the molecular weight of the polymer is relatively low. However, for high molecular weight polymers, mixing solid polymers with water may take relatively long periods to dissolve even with agitation. Frequently such high molecular weight polymer dissolution efforts suffer from the formation of "fish eyes," which form, at least in part, because the initial contact between the polymer and the water rapidly hydrates the outer layer of polymer and creates a sticky, rubbery exterior layer that delays or prevents hydration of the interior polymer. This causes the effective concentration of the high molecular weight polymer to be lower, thereby increasing the amount of high molecular weight polymer needed to achieve a desired viscosity.

Alternatively, pre-dissolved aqueous polymer concentrates can be used to produce high-viscosity aqueous-based treatment fluids. Dissolution by this method can be relatively quick. However, the high concentration of polymer required to yield a viable aqueous polymer concentrate lends itself to low molecular weight polymer because high molecular weight polymers yield aqueous polymer concentrates with very high and impractical viscosities, even at low concentrations.

Yet another avenue utilized for incorporating polymer into treatment fluids includes the use of polymer emulsions, which are prepared by emulsion polymerization of the monomers in a non-aqueous continuous phase. This is accomplished by emulsifying aqueous solutions of the monomers in a non-miscible continuous phase such as mineral oil containing suitable emulsifiers followed by polymerization to reach high molecular weights. Using this method, liquid additives containing stable, inverse emulsions with polymer loadings of 20-60% by weight of the internal phase can be produced. The surfactant package used in the production of polymeric emulsions can be designed in such a way that the emulsion can be added directly to aqueous-based treatment fluids to obtain aqueous hydrated polymer solutions. Generally, it is believed that the polymeric emulsions break and the high molecular weight polymers are exposed to and hydrated by the aqueous-based treatment fluids. However, these methods have inherent problems stemming from the need for the high molecular weight polymer to be properly hydrated. For example, the preparation times can be long, and the effective concentration of the polymer in the treatment fluid can be less, which may lead to premature crosslinking.

To ensure proper hydration, treatment fluids that utilize high molecular weight polymers are often mixed in batches and allowed to hydrate for long periods of time before use, e.g., over 24 hours. Accordingly, large volumes of treatment fluids are often mixed well in advance and stored on site until use, which provides for logistical issues and the potential for wasting significant amounts of costly unused treatment fluid that is not needed.

Further, lower effective concentrations of polymer can affect the timing of the crosslinking. That is, the crosslinker is, in effect, at a higher concentration than desired, which translates to premature crosslinking that further increases the viscosity of the treatment. If premature crosslinking occurs before the fluid has reached its desired location within the wellbore and/or subterranean formation, in some instances, the treatment fluid can become unpumpable, thereby causing costly and time-consuming remedial operations to be performed.

Methods and compositions that enable faster hydration of high molecular weight polymers would be of value, in that, they may enable continuous treatment fluid production.

SUMMARY OF THE INVENTION

The present invention provides for, in some embodiments, hydration acceleration surfactants utilized in conjunction with polymer emulsions, and methods and compositions relating thereto.

In one embodiment of the present invention, a method comprises: mixing an aqueous base fluid, a hydration acceleration surfactant, a crosslinker polymer, and a base polymer, thereby yielding a treatment fluid, wherein the base polymer is provided in the form of a first polymeric emulsion before mixing and/or the crosslinker polymer is provided in the form of a second polymeric emulsion before mixing; introducing the treatment fluid into a wellbore penetrating a subterranean formation; allowing the crosslinker polymer to react with the base polymer, thereby forming a gel; and allowing the gel to perform at least one function within the wellbore and/or the subterranean formation selected from the group consisting of bridge a fracture, provide fluid loss control, seal a rock surface, enable fluid diversion, plug a void, reduce formation permeability, control water production, and any combination thereof.

In another embodiment of the present invention, a method comprises: continuously mixing and introducing a treatment fluid into a wellbore penetrating a subterranean formation, wherein producing the treatment fluid involves mixing an aqueous base fluid, a hydration acceleration surfactant, a crosslinker polymer, and a base polymer, thereby yielding a treatment fluid, wherein the base polymer is provided in the form of a first polymeric emulsion before mixing and/or the crosslinker polymer is provided in the form of a second polymeric emulsion before mixing; allowing the crosslinker polymer to react with the base polymer, thereby forming a gel; and allowing the gel to perform at least one function within the wellbore and/or the subterranean formation selected from the group consisting of bridge a fracture, provide fluid loss control, seal a rock surface, enable fluid diversion, plug a void, reduce formation permeability, control water production, and any combination thereof.

In yet another embodiment of the present invention, a treatment fluid comprises: an aqueous base fluid; a hydration acceleration surfactant; a crosslinker polymer; a base polymer; an aqueous immiscible fluid; wherein the base polymer is provided in the form of a first polymeric emulsion before mixing and/or the crosslinker polymer is provided in the form of a second polymeric emulsion before mixing the treatment fluid.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 1 is a graph of gel time for various treatment fluids according to at least some embodiments of the present invention.

DETAILED DESCRIPTION

The present invention provides for, in some embodiments, hydration acceleration surfactants utilized in conjunction with polymer emulsions, and methods and compositions relating thereto.

The compositions and methods of the present invention that utilize hydration acceleration surfactants described herein may, in some embodiments, advantageously reduce the hydration time of inverse polymer emulsions, thereby minimizing the formation of fish eyes and mitigating the adverse effects of having a lower effective concentration of the polymer in a treatment fluid due to incomplete polymer hydration, e.g., premature crosslinking. The reduction in hydration time may also, in some embodiments, enable the continuous mixing and injecting of treatment fluids into subterranean formations, thereby abating logistical issues and the potential for wasting significant amounts of costly treatment fluid and rig time. Further, the use of a liquid additive (i.e., a polymer emulsion) enables more precise fluid delivery for treatment fluid mixing, optionally at the well site, because liquid additives can be metered in accurately at controlled rates using liquid injection pumps.

It should be noted that when "about" is used herein at the beginning of a numerical list, "about" modifies each number of the numerical list. It should also be noted that in some numerical listings of ranges, some lower limits listed may be greater than some upper limits listed. One skilled in the art will recognize that the selected subset will require the selection of an upper limit in excess of the selected lower limit.

In some embodiments, a treatment fluid of the present invention may comprise an aqueous base fluid, a hydration acceleration surfactant, a base polymer, and a crosslinker polymer, wherein the base polymer and/or the crosslinker polymer may be characterized as high molecular weight polymer(s). Accordingly, methods of the present invention may involve mixing a treatment fluid described herein by combining aqueous base fluids, hydration acceleration surfactants, base polymers, and crosslinker polymers, wherein the base polymer is provided in the form of a first polymeric emulsion before mixing and/or the crosslinker polymer is provided in the form of a second polymeric emulsion before mixing. As described above, polymeric emulsions are used, in some instances, to synthesize and obtain liquid additives containing high polymer loadings of high molecular weight polymers. When producing a treatment fluid described herein, the polymeric emulsion comprising the base polymer and/or the crosslinker polymer breaks, and the base polymer and/or the crosslinker polymer is hydrated with the aqueous base fluid of the treatment fluid. Advantageously, the use of hydration accelerating surfactants described herein may, in some embodiments, enable more rapid hydration of the base polymer and/or the crosslinker polymer. In some embodiments, the hydration time of polymer, that is, the time required to reach maximum viscosity, in the presence of hydration acceleration surfactants is reduced to less than 5 minutes. In some embodiments, the non-aqueous fluid that was the continuous phase in the polymer emulsion may become emulsified and remain as a discontinuous phase in the treatment fluid described herein.

At some desired time after mixing the various components of the treatment fluids described herein, the base polymer and the crosslinker polymer may react to form a crosslinked gel. Preferably, crosslinking occurs once the treatment fluid has been placed in a desired location within a subterranean formation. It should be noted that mixing the various components of a treatment fluid of the present invention may occur in any order. However, in preferred embodiments, the hydration acceleration surfactant is mixed with the aqueous base fluid prior to mixing the aqueous base fluid with the polymeric emulsion comprising the base polymer and/or the crosslinker polymer.

A polymeric emulsion suitable for use in conjunction with the methods and compositions of the present invention may, in some embodiments, comprises an oil-based continuous phase, an aqueous discontinuous phase containing the base polymer or the crosslinker polymer, and emulsifiers. The aqueous internal phase may contain the polymer in a solid form and/or in a dispersed/dissolved form. When the polymer in the internal phase is in the solid form, the emulsion is prepared by emulsion polymerization of the corresponding monomers, and not by dispersing a preformed polymeric solid in an oil based fluid with the aid of surfactants. The aqueous discontinuous phase of a polymeric emulsion described herein may comprise the base polymer or the crosslinker polymer, wherein the amount of water in the discontinuous phase may range from 20% to 90% by weight of the discontinuous phase.

The utilization of hydration acceleration surfactants in the methods and compositions of the present invention may, in some embodiments, advantageously enable continuous methods (e.g., on-the-fly methods) that involve mixing of treatment fluids described herein and introducing the treatment fluids into a subterranean formation.

In some embodiments, the base polymers and/or crosslinker polymers of a treatment fluid described herein may react, i.e., the crosslinker polymer may crosslink the base polymer, and yield a crosslinked gel suitable for bridging a fracture, reducing or blocking formation permeability, providing fluid loss control, sealing a rock surface, enabling fluid diversion, plugging a void, controlling water production, and any combination thereof within the subterranean formation. In some embodiments, pores, voids, high-permeability porosity, and the like may be found in conjunction with a gravel pack within the wellbore, a borehole surface within the wellbore, a proppant pack within a subterranean formation, rock faces within a subterranean formation (including in fractures, microfractures, and the like), high permeability channels, and the like, and any combination thereof. For simplicity, as used herein, unless otherwise specified, when referring to occurrences "in a subterranean formation," each of the aforementioned situations are encompassed.

"Fluid loss," as that term is used herein, refers to the undesirable migration or loss of fluids (such as the fluid portion of a drilling mud or cement slurry) into a subterranean formation. Treatment fluids of the present invention may, in some embodiments, be used in any number of subterranean operations, including drilling operations, fracturing operations, acidizing operations, gravel-packing operations, well bore clean-out operations, produced water reduction or elimination, and the like. Fluid loss may be problematic in any number of these operations. In fracturing operations, for example, fluid loss into the formation may result in a reduction in fluid efficiency, such that the fracturing fluid cannot propagate fracture formation as desired. Without being limited by theory treatment fluids of the present invention may, in some embodiments, lower the volume of a filtrate that passes through a filter medium. That is, they block the pore throats and spaces that otherwise allow a fluid to leak out of a desired zone and into an undesired zone. Treatment fluids of the present invention may, in some embodiments, be used to control fluid loss by filling/bridging the pore spaces, voids, and the like in subterranean formation, e.g., forming a type of filter cake that blocks the pore spaces at or near the borehole surface to prevent fluid loss into the subterranean formation.

Fluid diversion is a similar approach to fluid loss control but strives for a somewhat different approach where a portion of the subterranean formation is sealed off or rendered less permeable. By way of example, in order to divert a fluid from highly permeable portions of the formation into the less permeable portions of the formation, a volume of treatment fluid may be pumped into the high permeability portion of the formation to partially or completely seal off that portion from subsequent fluid penetration. When being placed, the treatment fluid will flow most readily into the portion of the formation having the largest pores, fissures, or vugs, until that portion is bridged and sealed, thus diverting the remaining and/or subsequent fluid to the next most permeable portion of the formation. Treatment fluid may be utilized until the desired level of sealing is achieved.

Simultaneous production of water with oil in aged wells is a recurring problem that can be very expensive. In some instances, reduction in produced water may be accomplished by injection of gel forming chemicals comprising crosslinkable compositions into the water producing zone and allowing the gel formation inside the permeability of the formation to block produced water ingress into the wellbore, thereby beneficially increasing the oil/water ratio of the produced fluids. The treatment fluids of the present invention are, in some embodiments, suitable for reducing the water content of produced fluid, e.g., in aged wells.

Introducing a treatment fluid described herein into a subterranean formation may be involved with a plurality of operations. Such operations may include, but are not limited to, drilling operations, lost circulation operations, stimulation operations, sand control operations, completion operations, acidizing operations, scale inhibiting operations, water-blocking operations, clay stabilizer operations, fracturing operations, frac-packing operations, gravel packing operations, wellbore strengthening operations, and sag control operations. The methods and compositions of the present invention may be used in full-scale operations or pills. As used herein, a "pill" is a type of relatively small volume of specially prepared treatment fluid placed or circulated in the wellbore. One skilled in the art, with the benefit of this disclosure, should recognize parameters necessary for performing each of these operations. For example, fracturing operation may, in some embodiments, involve introducing a treatment fluid of the present invention at a pressure/rate sufficient to create or extend at least one fracture in that portion of the subterranean formation.

Some embodiments of the present invention may include producing hydrocarbons from at least a portion of a subterranean formation, wherein the subterranean formation has been treated with a treatment fluid described herein. In some embodiments, hydrocarbons may be produced from the portion of the subterranean formation having been treated with the treatment fluid or from a second portion of the subterranean formation having not been treated with the treatment fluid.

In some embodiments, subterranean formation suitable for use in conjunction with the methods and compositions of the present invention may have a bottom hole circulating temperature of about 450° F. or lower. In some embodiments, subterranean formations suitable for use in conjunction with the methods and compositions of the present invention may have a bottom hole circulating temperature ranging from a lower limit of about 40° F., 100° F., or 200° F. to an upper limit of about 450° F., 400° F., 300° F., or 250° F., and wherein the bottom hole circulating temperature may range from any lower limit to any upper limit and encompass any subset therebetween.

As described above, in some embodiments, a treatment fluid of the present invention may comprise an aqueous base fluid, hydration acceleration surfactants, and a crosslinked gel that comprises base polymers reacted with crosslinker polymers.

Hydration acceleration surfactants suitable for use in conjunction with forming treatment fluids of the present invention may, in some embodiments, have a hydrophilic-lipophilic balance of about 10 or greater, or more preferably 13 or greater. In some embodiments, a hydration acceleration surfactant suitable for use in conjunction with forming treatment fluids of the present invention may have a hydrophilic-lipophilic balance ranging from a lower limit of about 10, 13, or 15 to an upper limit of about 60, 50, 40, 25, 23, 20, or 18, and wherein the hydrophilic-lipophilic balance may range from any lower limit to any upper limit and encompass any subset therebetween.

Examples of hydration acceleration surfactants suitable for use in conjunction with forming treatment fluids of the present invention may, in some embodiments, include, but are not limited to, $C_8$-$C_{30}$ alcohol ethoxylates having at least about 5 ethylene oxide units, wherein the $C_8$-$C_{30}$ may comprise a linear alkyl chain, a branched alkyl chain, an internal aryl group, and the like (e.g., branched polyoxyethylene (5) nonylphenylether (available as IGEPAL® CO-520 from Sigma-Aldrich), polyoxyethylene (10) cetyl ether (available as BRIJ®C10 from Sigma-Aldrich), polyoxyethylene (20) stearyl ether (available as BRIJ®S20 from Sigma-Aldrich), polyoxyethylene (100) stearyl ether (available as BRIJ®100 from Sigma-Aldrich), and polyoxyethylene (150) dinonylphenyl ether (available as IGEPAL® DM-970 from Sigma-Aldrich)); block copolymers of polyethylene and polyethylene glycol; block copolymers of polypropylene glycol and polyethylene glycol; polyethylene glycol sorbitans (e.g., polyethylene glycol sorbitan monolaurate (commercially available as TWEEN®20 from Sigma-Aldrich), polyethylene glycol sorbitan monostearate (commercially available as TWEEN®60 from Sigma-Aldrich), polyethylene glycol sorbitan tetraoleate, and polyethylene glycol sorbitan monopalmitate (commercially available as TWEEN®40 from Sigma-Aldrich)); sulfate surfactants (e.g., sodium lauryl sulfate); sulfonate surfactants; phosphate surfactants; carboxylate surfactants; secondary amine surfactants; tertiary amine surfactants; quaternary ammonium surfactants (e.g., cetylpyridinium chloride, benzalkonium chloride, and dioctadecyldimethylammonium bromide); and the like, any derivative thereof, and any combination thereof. In some preferred embodiments, the hydration acceleration surfactants suitable for use in conjunction with forming treatment fluids of the present invention are non-ionic.

In some embodiments, hydration acceleration surfactants may be present in treatment fluids of the present invention in amounts ranging from a lower limit of about 0.001%, 0.01%, or 0.05% to an upper limit of about 1%, 0.5%, 0.1%, or 0.05% by weight of the aqueous base fluid, and wherein the amount may range from any lower limit to any upper limit and encompass any subset therebetween.

In some embodiments, the treatment fluids of the present invention, may comprise base polymers and crosslinker polymers that have a predefined gel time (i.e., time until crosslinking has substantially occurred) that allows for placement of an uncrosslinked treatment fluid in a desired location inside the formation and then crosslink after placement.

In some embodiments, forming a treatment fluid of the present invention may involve mixing (1) a polymeric emulsion containing the base polymer in the internal phase and (2) the crosslinker polymer in non-emulsion form. In another embodiment, forming a treatment fluid of the present invention may involve mixing (1) a polymeric emulsion containing a crosslinker polymer in the internal phase and (2) the base polymer in the non-emulsion form. In yet another embodiment, forming a treatment fluid of the present invention may involve mixing (1) a first polymeric emulsion containing the base polymer in the internal phase and (2) a second polymeric emulsion containing a crosslinker polymer in the internal phase. It should be noted that in the foregoing embodiments, (1) and (2) are used for clarity and are not limiting as to an order of mixing or the inclusion of other components in the mixing processes, including additional base polymers and/or crosslinker polymers in polymer emulsions or otherwise.

In some embodiments, base polymers suitable for use in conjunction with forming treatment fluids of the present invention may include, but are not limited to, polyacrylamides, acrylamide copolymers, polymethacrylamides, methacrylamide copolymers, copolymers of acrylamide and methacrylamide, polyacrylate esters (including alkyl and/or aryl esters), copolymers of acrylamide and acrylate esters, copolymers of acrylate esters and methacrylamide, copolymers of 2-acrylamido-2-methylpropane sulfonic acid and acrylamide, and partially hydrolyzed versions thereof. As used herein, the term "at least partially hydrolyzed" refers to base polymers that have at least a portion of their side chain amide or ester groups hydrolyzed to form side chain acid groups. That is, base polymers that are partially hydrolyzed have at least some acrylic acid monomer units. In various embodiments, the degree of hydrolysis can range from about 0.1% to about 30% of the acrylamide/acrylate monomeric units. Depending on the pH of the treatment fluid, base polymers that are at least partially hydrolyzed may have their acidic side chains protonated (i.e., acidic) or deprotonated (i.e., anionic form).

Examples of suitable methacrylamide base polymers are described in U.S. Pat. No. 6,176,315, which is incorporated herein by reference in its entirety. Examples of commercially available polymer emulsions comprising base polymers described herein may include, but are not limited to, ALCOMER® L products (an anionic polyacrylamide copolymer with molecular weights greater than 1,000,000, available from BASF Corporation). Examples of commercially available non-emulsion type base polymers available as liquid additive include HZ-10™ (a copolymer of t-butylacrylate and acrylamide, available from Halliburton Energy Services, Inc.) and HZ-30™ (a partially hydrolyzed polyacrylamide, available from Halliburton Energy Services, Inc.).

In some embodiments, base polymers suitable for use in conjunction with forming treatment fluids of the present invention may include, but are not limited to, copolymers that comprise at least one first monomeric unit of acrylamide, methacrylamide, and/or an acrylate ester in combination with at least one second monomeric unit of, for example, N,N-dimethylacrylamide, N-vinyl pyrrolidone, 2-acrylamido-2-methyl propane sulfonic acid or salts thereof, and the like. Such copolymers may also be partially hydrolyzed in some embodiments. Examples of such copolymers include MA-100™ and MA 300™ (available from Halliburton Energy Services, Inc.) and HE®-150 (high viscosity synthetic polymer emulsion in glycol ether, available from Drilling Specialties Company).

In some embodiments, base polymers suitable for use in conjunction with forming treatment fluids of the present invention may have a molecular weight of about 100,000 or greater. In some embodiments, the molecular weight of base polymers suitable for use in conjunction with forming treatment fluids of the present invention may range from a lower limit of about 100,000, 250,000, 500,000, or 1,000,000 to an upper limit of about 20,000,000, 10,000,000, or 5,000,000, and wherein the molecular weight may range from any lower limit to any upper limit and encompass any subset therebetween. When the base polymer is in a polymer emulsion described herein prior to forming a treatment fluid described herein, the molecular weight of base polymers may, in some embodiments, range in the lower limit of about 1,000,000, 3,000,000, or 5,000,000 to an upper limit of about 20,000,000, 15,000,000, or 10,000,000, and wherein the molecular weight may range from any lower limit to any upper limit and encompass any subset therebetween.

In some embodiments, base polymers may be present in treatment fluids of the present invention in amount of about 5% or less by weight of the aqueous base fluid, or more preferably about 2% or less by weight of the aqueous base fluid. In some embodiments, base polymers may be present in treatment fluids of the present invention in amounts ranging from a lower limit of about 0.01%, 0.05%, 0.1%, or 0.5% to an upper limit of about 5%, 3%, 2%, or 1% by weight of the aqueous base fluid, and wherein the amount may range from any lower limit to any upper limit and encompass any subset therebetween.

In some embodiments, crosslinker polymers suitable for use in conjunction with forming treatment fluids of the present invention may include, but are not limited to, polymers and/or copolymers having at least one monomeric unit that comprises primary amines, secondary amines, any derivative thereof, any salt thereof, and any combination thereof. The amine groups on the polymer chain may be pendant groups or part of the polymer backbone. Crosslinker polymers suitable for use in conjunction with forming treatment fluids of the present invention may, in some embodiments, include, but are not limited to, polyalkyleneimines, polyalkylenepolyamines, polyethyleneimine, polyvinylamine, polyethylenepolyamine, polypropyleneimine, polypropylenepolyamine, polyallylamine, chitosan, polymyxins, polylysine, any derivative thereof, any salt thereof, and any combination thereof. Examples of suitable commercially available crosslinker polymers may include, but are not limited to, HZ-20™ (polyethyleneimine, available from Halliburton Energy Services) and LUPAMINE® products (polyvinylamines, available from BASF).

In some embodiments, crosslinker polymers suitable for use in conjunction with forming treatment fluids of the present invention may have a molecular weight of about 5,000 or greater. In some embodiments, the molecular weight of crosslinker polymers suitable for use in conjunction with forming treatment fluids of the present invention may range from a lower limit of about 5,000, 10,000, 50,000, 100,000, 250,000, 500,000, or 1,000,000 to an upper limit of about 10,000,000, 5,000,000, or 1,000,000, and wherein the molecular weight may range from any lower limit to any upper limit and encompass any subset therebetween. When the crosslinker polymer is in a polymer emulsion described herein prior forming a treatment fluid described herein, the molecular weight of crosslinker polymers may, in some embodiments, range in the lower limit of about 250,000, 500,000, or 1,000,000 to an upper limit of about 10,000,000, 5,000,000, or 1,000,000, and wherein the molecular weight may range from any lower limit to any upper limit and encompass any subset therebetween.

In some embodiments, crosslinker polymers may be present in treatment fluids of the present invention in amount of about 5% or less by weight of the aqueous base fluid, more preferably about 2% or less by weight of the aqueous base fluid, or most preferably about 0.5% or less by weight of aqueous fluid. In some embodiments, crosslinker polymers may be present in treatment fluids of the present invention in amounts ranging from a lower limit of about 0.05%, 0.1%, or 0.5% to an upper limit of about 5%, 3%, 2%, 1%, 0.5%, or 0.1% by weight of the aqueous base fluid, and wherein the amount may range from any lower limit to any upper limit and encompass any subset therebetween.

In some embodiments, the weight ratio of base polymer to crosslinker polymer in treatment fluids of the present invention may range from a lower limit of about 1:0.99, 1:0.9, 1:0.75, or 1:0.5 to an upper limit of about 1:0.1, 1:0.25, or 1:0.5, and wherein the weight ratio may range from any lower limit to any upper limit and encompass any subset therebetween.

In some embodiments, aqueous base fluids suitable for use in conjunction with the treatment fluids described herein may include, but are not limited to, aqueous fluid, aqueous-miscible fluids, and any combination thereof. Aqueous fluids may, in some embodiments, include, but are not limited to, fresh water, saltwater (e.g., water containing one or more salts dissolved therein), brines (e.g., saturated salt water), seawater, and any combination thereof. Suitable aqueous-miscible fluids may, in some embodiments, include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous fluid described above, and any combination thereof.

In some embodiments, a treatment fluids described herein may comprise aqueous-immiscible fluids, for example, the continuous phase of polymeric emulsions used in conjunction with forming said treatment fluid. In some preferred embodiments, the aqueous-immiscible fluid may be emulsified into a discontinuous phase of the treatment fluid. Such a discontinuous phase may be stabilized, in some embodiments, by surfactants from the polymeric emulsion and/or the hydration acceleration surfactant utilized in the formation of the treatment fluid.

In some embodiments, treatment fluids of the present invention may optionally further comprise additives. Additives suitable for use in conjunction with the methods and compositions described herein may include, but are not limited to, gel-time modifiers, salts, weighting agents, inert solids, fluid loss control agents, oil-in-water emulsifiers, dispersion aids, corrosion inhibitors, viscosifying agents, surfactants, proppants, gravel particulates, lost circulation materials, foaming agents, gases, pH control additives, breakers, biocides, stabilizers, chelating agents, scale inhibitors, gas hydrate inhibitors, mutual solvents, oxidizers, reducers, friction reducers, clay stabilizing agents, and the like, and any combination thereof. In some embodiments, cement and/or cementitious material (e.g., Portland cements) may be substantially excluded from the treatment fluids described herein (e.g., present at a concentration of less than about 0.1% by weight of aqueous base fluid). In some embodiments, the treatment fluids are completely free of suspended solids (e.g., cement).

Examples of suitable gel-time modifiers (e.g., gel-time retarders and gel-time accelerators) may, in some embodiments, include, but are not limited to, inorganic acids, organic acids, organic salts, inorganic salts, and the like, and any combination thereof. Nonlimiting examples of such gel-time modifiers are set forth in U.S. Pat. No. 7,331,390 entitled "Compositions and Methods for Plugging and Sealing a Subterranean Formation," U.S. Pat. No. 7,325,613 entitled "Crosslinkable Polymer Compositions Comprising Phenols and Associated Methods," U.S. Pat. No. 7,322,414 entitled "Crosslinkable-Polymer Compositions and Associated Methods," U.S. Pat. No. 7,287,587 entitled "Crosslinkable Polymer Compositions and Associated Methods," U.S. Pat. No. 7,091,160 entitled "Methods and Compositions for Reducing Subterranean Formation Permeabilities," and U.S. Pat. No. 6,196,317 entitled "Method and Compositions for Reducing the Permeabilities of Subterranean Zones," and co-pending U.S. patent application Publications Nos. (all filed on Mar. 3, 2010) US 2011/0214865 entitled "Weak Organic Acid as Gelation Retarder for Crosslinkable Polymer Compositions," US 2011/0214866 entitled "Salt of Weak Bronsted Base and Bronsted Acid as Gelation Retarder for Crosslinkable Polymer Compositions," and US 2011/0214867 entitled "Lewis Acid as Gelation Retarder for Crosslinkable Polymer Compositions," each of which are incorporated herein by reference in their entirety. Specific illustrative examples of gel-time modifiers may include, for example, alkali metal carbonates, bicarbonates, acetates, formates, hydroxides, organic acids (e.g., phenols and acetic acid), mineral acids (e.g., hydrochloric acid), Lewis acids (e.g., boric acid), and the like, and any combination thereof.

To facilitate a better understanding of the present invention, the following examples of preferred or representative embodiments are given. In no way should the following examples be read to limit, or to define, the scope of the invention.

EXAMPLES

Example 1

Three treatment fluids were prepared according to the concentrations listed in Table 1 utilizing water containing 2% KCl, a hydration acceleration surfactant of PEN-5® (an aqueous solution of $C_{12}$-$C_{14}$ ethoxylated alcohol with 11 moles of ethylene oxide and an HLB of 14, available from Halliburton Energy Services, Inc.), and a polymeric emulsion comprising a base polymer of ALCOMER® A90L (polyacrylamide with a molecular weight of greater than about 11,000,000 and a degree of hydrolysis less than about 8%, available from BASF). The amount of polymer in the treatment fluid was maintained at 0.72% by weight of the fluid.

TABLE 1

|  | Control | Sample 1 | Sample 2 |
| --- | --- | --- | --- |
| PEN-5 ® | 0 | 2 gal/Mgal | 5 gal/Mgal |
| ALCOMER ® A90L | 15 gal/Mgal (0.72% polymer) | 15 gal/Mgal | 15 gal/Mgal |

The viscosity of the treatment fluid was measured over time and is reported in FIG. 1, which illustrates the polymer hydration time (i.e., the time for the viscosity of the treatment fluid to stabilize) for the control of about 35 minutes, Sample 1, and Sample 2 of less than about 5 minutes. The ultimate viscosity reached for Sample 2 was higher than that for Sample 1 and similar to the control sample after complete hydration. Further increase in PEN-5® concentration to 10 gal/Mgal, not shown, had little affect on the hydration and the viscosity of the solution beyond the values obtained for Sample 2.

This example illustrates that hydration acceleration surfactants can decrease the hydration time for high molecular weight polymers in polymeric emulsions to less than about 5 minutes.

Example 2

To a fresh batch of Sample 2 described in Example 1, 13 gal/Mgal HZ-20™ crosslinker polymer was added along with a solution of an additive GEL-STA™ (an inorganic salt, available from Halliburton Energy Service, Inc.) that may prevent polymer degradation at elevated temperature. The base polymer to crosslinker ratio for this formulation was 1.0:0.54. The solution was divided into two batches. To one batch, two concentrations of a gel time retarder K-35™ (a carbonate salt, available from Halliburton Energy Service, Inc.) designed to extend the crosslinker time at a given temperature were added as shown in Table 2, and the crosslinking times (gel times) were measured at different temperatures as shown Table 2.

TABLE 2

| Sample | Temperature (° F.) | K-35 ™ (5 lb/Mgal) | K-35 ™ (15 lb/Mgal) |
| --- | --- | --- | --- |
| 1 | 185 | 7 | 15 |
| 2 | 195 | 4 | 8 |
| 3 | 205 | 3 | 7 |
| 4 | 215 | 2.5 | 6 |
| 5 | 225 | 1.5 | 3.5 |

The results in Table 2 demonstrate that crosslinked compositions can be formed using methods that involve hydration of polymer emulsions in the presence of hydration accelerating surfactants. Additionally, the results illustrate that the aqueous-immiscible fluids form the continuous phase of the polymer emulsion ALCOMER® A90L did not interfere with the crosslinking reactions.

Example 3

Permeability reduction experiments were performed using a core flow study at 180° F. in which a sand pack prepared with 20/40 sand was used as the core. The treatment fluid described in Example 2 without the retarder was introduced into the sand pack, and a sufficient amount of time was allowed for the crosslinking reactions to take place. Then, the resistance to fluid flow through the treated sand pack was measured by pumping a 2% KCl solution through the treated sand pack. The results showed that the permeability of the treated sand pack to 2% KCl solution was reduced by 100%. Similar results were obtained by treating a sand pack prepared with graded 16/20 calcium carbonate particle at a temperature of 225° F.

This example illustrates that the treatment fluid described herein may, in some embodiments, be suitable for use in bridging a fracture, reducing or blocking formation permeability to fluid flow, providing fluid loss control, sealing a rock surface for fluid diversion, plugging a void, controlling water production, and any combination thereof within the subterranean formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   mixing an aqueous base fluid, a nonionic hydration acceleration surfactant having a hydrophilic-lipophilic balance of about 10 or greater, a crosslinker polymer, and a base polymer, thereby yielding a treatment fluid,
      wherein the base polymer is provided in the form of a first polymeric emulsion before mixing and/or the crosslinker polymer is provided in the form of a second polymeric emulsion before mixing;
   introducing the treatment fluid into a wellbore penetrating a subterranean formation;
   allowing the crosslinker polymer to react with the base polymer, thereby forming a gel; and
   allowing the gel to perform at least one function within the wellbore and/or the subterranean formation selected from the group consisting of bridge a fracture, provide fluid loss control, seal a rock surface, enable fluid diversion, plug a void, reduce formation permeability, control water production, and any combination thereof.

2. The method of claim 1, wherein upon mixing the first polymeric emulsion with the aqueous base fluid the base polymer reaches a substantially steady state of hydration within about 5 minutes.

3. The method of claim 1, wherein the first polymeric emulsion comprises the base polymer, an oil-based continuous phase, and an emulsifier.

4. The method of claim 1, wherein the second polymeric emulsion comprises the crosslinker polymer, an oil-based continuous phase, and an emulsifier.

5. The method of claim 1, wherein the aqueous base fluid comprises an aqueous miscible fluid.

6. The method of claim 1, wherein treatment fluid further comprises an aqueous immiscible fluid.

7. The method of claim 1, wherein the treatment fluid comprises the base polymer and the crosslinker polymer in a weight ratio of about 1:0.99 to about 1:0.1.

8. The method of claim 1, wherein the base polymer has a molecular weight of about 100,000,000 g/mol or greater and the crosslinker polymer has a molecular weight of about 50,000 or greater.

9. The method of claim 1, wherein the base polymer has a molecular weight of about 100,000 g/mol or greater and the crosslinker polymer has a molecular weight of about 250,000 or greater.

10. The method of claim 1, wherein the base polymer is present in the treatment fluid in an amount of about 5% or less by weight of the aqueous base fluid.

11. The method of claim 1, wherein mixing and introducing are continuous.

12. The method of claim 1, wherein mixing and introducing are at a wellbore site.

13. A method comprising:
   continuously mixing and introducing a treatment fluid into a wellbore penetrating a subterranean formation,
      wherein producing the treatment fluid involves mixing an aqueous base fluid, a nonionic hydration acceleration surfactant having a hydrophilic-lipophilic balance of about 10 or greater, a crosslinker polymer, and a base polymer, thereby yielding a treatment fluid,
      wherein the base polymer is provided in the form of a first polymeric emulsion before mixing and/or the crosslinker polymer is provided in the form of a second polymeric emulsion before mixing;
   allowing the crosslinker polymer to react with the base polymer, thereby forming a gel; and
   allowing the gel to perform at least one function within the wellbore and/or the subterranean formation selected from the group consisting of bridge a fracture, provide fluid loss control, seal a rock surface, enable fluid diversion, plug a void, reduce formation permeability, control water production, and any combination thereof.

14. The method of claim 13, wherein the base polymer has a molecular weight of about 100,000,000 g/mol or greater and the crosslinker polymer has a molecular weight of about 50,000 or greater.

15. The method of claim 13, wherein the base polymer has a molecular weight of about 100,000 g/mol or greater and the crosslinker polymer has a molecular weight of about 250,000 or greater.

16. The method of claim 13, wherein the base polymer is present in the treatment fluid in an amount of about 2% or less by weight of the aqueous base fluid.

17. A treatment fluid comprising:
   an aqueous base fluid;
   a nonionic hydration acceleration surfactant having a hydrophilic-lipophilic balance of about 10 or greater;
   a crosslinker polymer;
   a base polymer;
   an aqueous immiscible fluid;
   wherein the base polymer is provided in the form of a first polymeric emulsion before mixing and/or the crosslinker polymer is provided in the form of a second polymeric emulsion before mixing the treatment fluid.

18. The treatment fluid of claim 17, wherein the base polymer has a molecular weight of about 100,000,000 g/mol or greater and the crosslinker polymer has a molecular weight of about 50,000 or greater.

19. The treatment fluid of claim 17, wherein the base polymer has a molecular weight of about 100,000 g/mol or greater and the crosslinker polymer has a molecular weight of about 250,000 or greater.

20. The treatment fluid of claim 17, wherein the base polymer is present in the treatment fluid in an amount of about 5% or less by weight of the aqueous base fluid.

* * * * *